(No Model.)
F. M. ASHLEY.
BICYCLE TIRE.
No. 531,608.                               Patented Dec. 25, 1894.
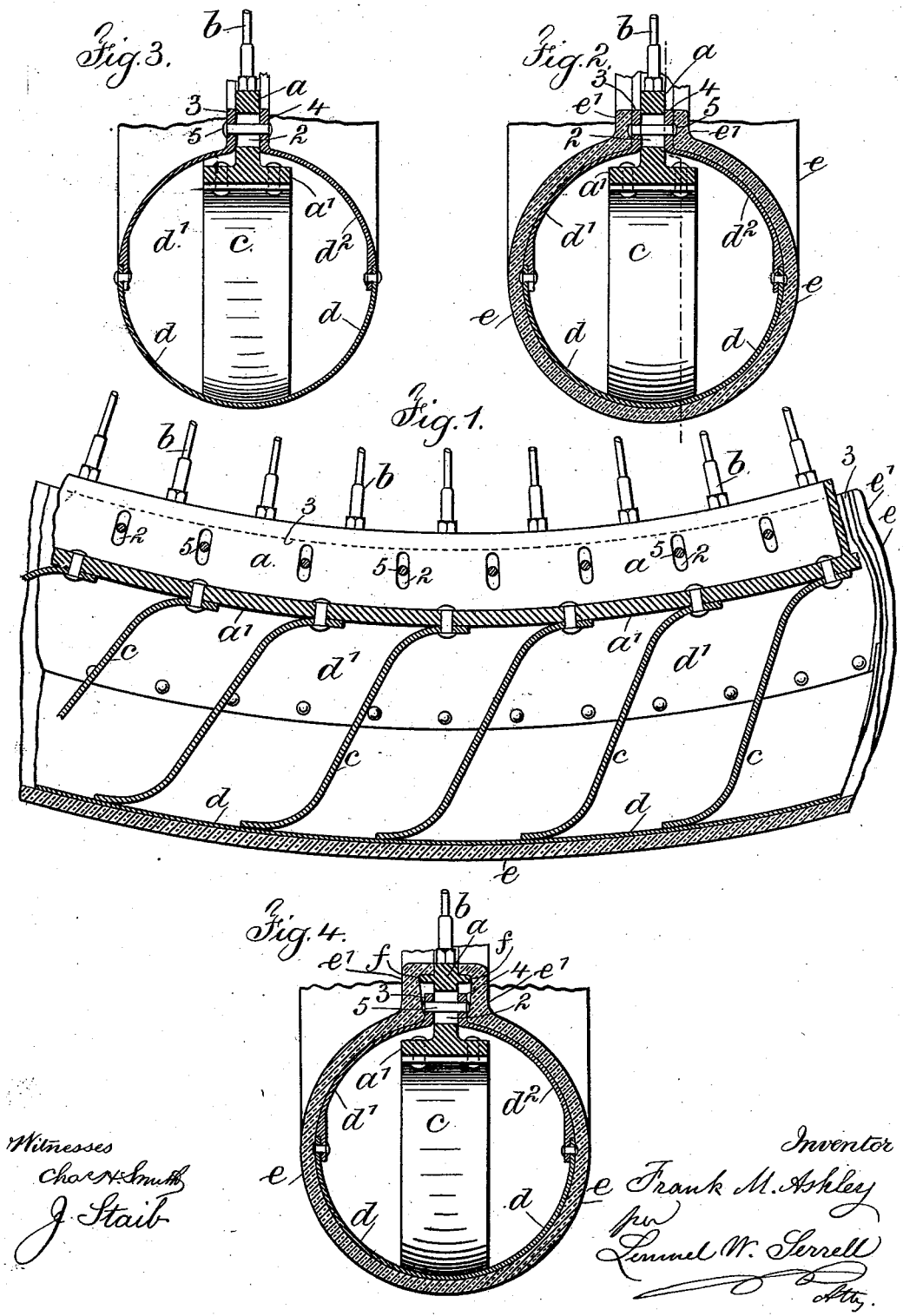
Witnesses
Chas. H. Smith
J. Staib
Inventor
Frank M. Ashley
per
Lemuel W. Serrell
Atty.

UNITED STATES PATENT OFFICE.

FRANK M. ASHLEY, OF HAWTHORNE, NEW JERSEY.

BICYCLE-TIRE.

SPECIFICATION forming part of Letters Patent No. 531,608, dated December 25, 1894.

Application filed March 12, 1894. Serial No. 503,253. (No model.)

*To all whom it may concern:*

Be it known that I, FRANK M. ASHLEY, a citizen of the United States, residing at Hawthorne, in the county of Passaic and State of New Jersey, have invented a new and useful Improvement in Bicycle-Tires, of which the following is a specification.

The object of my invention is to produce a tire that is always in form ready for use, which does not require to be air inflated and which cannot be punctured or injured by nails, glass or similar things liable to be run across in the path of the bicycle.

In carrying out my invention I provide the bicycle wheels with fellies of T-shape in cross section, and the radial or tangent spokes are connected to the rib of the T-shaped felly.

The tire is a spring metal tube open centrally along the inner face and receiving the T-shaped felly and connected thereto by riveted pins passing through edge flanges of the tube and through mortises in the rib of the felly which provide for a yielding movement of the metal tube. Connected to the face of the T-shaped felly and projecting therefrom are curved blade springs whose outer free ends bear against the inside of the outer portion of the metal tube. These blade springs will not yield under the weight of the machine but will yield slightly under the weight of the bicycle rider. A rubber shoe surrounds and is cemented to the metal tube and comes up to the rib of the wheel felly and over the flanges of the steel tube tire. The tire does not require to be air inflated, the metal tube cannot be punctured while in use, and holes made in the rubber shoe are of no account, the yielding metal tube and springs and the rubber tire providing for all the resilience desirable in a bicycle tire.

In the drawings, Figure 1 is a vertical longitudinal section illustrating my improvements. Fig. 2 is a cross section of the same. Fig. 3 is a cross section without the rubber shoe, and Fig. 4 is a cross section illustrating a slight modification.

The felly of the wheel is composed of a rib $a$ and a nearly flat bar face $a'$ together forming a T-shaped figure in cross section. The radial or tangent spokes $b$ are screwed in or otherwise secured in any ordinary manner to the inner edge of the rib $a$, and the rib $a$ is pierced with mortises at 2 that are radial to the axis of the wheel. To the outer face of the bar $a'$ curved blade springs $c$ are secured at one end at intervals upon the periphery of the felly.

The steel tube tire of comparatively thin spring metal is composed of the outer half circle section $d$ and inner curved quarter circle sections $d'd^2$. The sections $d'd^2$ are connected along one edge by rivets to the edges of the section $d$ and the other edges of the sections $d'd^2$ have flanges 3 4 that are adapted to lie flat against the opposite faces of the rib $a$, said flanges receiving the rib $a$ between them and the bar face $a'$ being within the steel tube tire.

Rivet pins 5 pass through the flanges 3 4 and mortises 2 in connecting the felly of the wheel and tube tire.

I do not limit myself to the steel tube tire made of sections $d\ d'\ d^2$, as it is obviously possible to make the entire tube and flanges 3 4 in one piece.

The outer free ends of the blade springs $c$ bear against the inner face of the outer section $d$ and exert a pressure sufficient to amply sustain the weight of the bicycle without a rider and maintain the tube tire distended to a position wherein the rivet pins 5 occupy about the center of the mortises 2, as shown.

The rubber shoe $e$ surrounds and is cemented to the steel tube tire, and the said rubber shoe is provided with flanges $e'e'$ resting upon and cemented to the faces of the flanges 3 4.

This rubber shoe $e$ may be of any desired thickness. It may be provided with a thickened tread or with a smooth or corrugated surface.

The modification shown in Fig. 4 consists in forming the rib $a$ with auxiliary flanges $f$ over which the flanges of the rubber shoe extend and are secured to insure a more complete water and dust tight connection between the parts.

The weight of the rider of the bicycle will cause the springs to yield so that the rivet pins 5 may come against the inner ends of the mortises. Beyond this point the tire tube cannot move inward and additional or greater weight will cause the springs $c$ to yield further and the tube tire also to yield from a round form to an ellipse the plane of whose greatest breadth is at right angles to the vertical plane of the wheel. The point of yielding is of course at the place of touching the ground, the tire being normal or approximately so at all other points, and yielding progressively as the wheel revolves.

The steel tube tire is put in place before the ends are connected by first spreading the central opening to receive the felly, then joining the respective ends of the tube and thereafter inserting the rivet pins as described.

I claim as my invention—

1. In a bicycle tire, a felly having a flat bar face and springs connected therewith, in combination with a thin metal tube open centrally along its inner face and having flanged edges adjacent to the sides of the felly, means for connecting said flanges to the felly and a rubber shoe outside the tube, substantially as specified.

2. In a bicycle tire, a metal felly of T-shape in cross section and projecting blade springs connected to the face of the felly, in combination with a spring metal tube divided centrally and having flanged edges to receive the web of the T shaped felly and with means for securing the flanges and connecting them to the felly, substantially as specified.

3. In a bicycle tire, the combination with the rubber shoe, of a steel tube within the rubber shoe, a felly composed of a rib and flat faced bar, means for connecting the same and the tire, and springs connected to the outer surface of the bar and bearing against the inner face of the steel tube, substantially as set forth.

4. In a bicycle tire a felly composed of a rib $a$ with radial mortises and a flat bar face $a'$, in combination with the blade springs $c$ secured to said bar face, the steel tube tire surrounding said springs and composed of the outer curved section $d$ and inner curved sections $d'$ $d^2$ and flanges 3 4, the rivet pins 5 passing through the flanges and rib and connecting the parts and the rubber shoe surrounding and cemented to the steel tube, substantially as set forth.

Signed by me this 6th day of March, A. D. 1894.

FRANK M. ASHLEY.

Witnesses:
GEO. T. PINCKNEY.
HAROLD SERRELL.